US009015450B2

(12) United States Patent
Sun et al.

(10) Patent No.: US 9,015,450 B2
(45) Date of Patent: Apr. 21, 2015

(54) APPARATUS UTILIZING EFFICIENT HARDWARE IMPLEMENTATION OF SHADOW REGISTERS AND METHOD THEREOF

(75) Inventors: Hong-Xia Sun, Beijing (CN); Peng Fei Zhu, Beijing (CN); Yong Qiang Wu, Beijing (CN)

(73) Assignee: STMicroelectronics (Beijing) R&D Co. Ltd., Beijing (CN)

( * ) Notice: Subject to any disclaimer, the term of this patent is extended or adjusted under 35 U.S.C. 154(b) by 1029 days.

(21) Appl. No.: 12/690,719

(22) Filed: Jan. 20, 2010

(65) Prior Publication Data

US 2010/0205387 A1 Aug. 12, 2010

(30) Foreign Application Priority Data

Jan. 24, 2009 (CN) .......................... 2009 1 0002807

(51) Int. Cl.
*G06F 15/00* (2006.01)
*G06F 9/30* (2006.01)
*G06F 9/40* (2006.01)
*G06F 9/38* (2006.01)

(52) U.S. Cl.
CPC ............ *G06F 9/30116* (2013.01); *G06F 9/384* (2013.01); *G06F 9/3863* (2013.01); *G06F 9/30123* (2013.01)

(58) Field of Classification Search
None
See application file for complete search history.

(56) References Cited

U.S. PATENT DOCUMENTS

| 6,564,331 | B1* | 5/2003 | Joshi ............................. 713/324 |
| 7,539,879 | B2* | 5/2009 | Terechko et al. ............. 713/300 |
| 2002/0052993 | A1* | 5/2002 | Dowling ....................... 710/260 |
| 2003/0074545 | A1* | 4/2003 | Uhler ............................ 712/228 |
| 2004/0153634 | A1* | 8/2004 | Barry et al. .................... 712/228 |
| 2008/0313435 | A1* | 12/2008 | Orion et al. .................... 712/217 |

OTHER PUBLICATIONS

Ayala et al. (Power-Aware Compilation for Register File Energy Reduction, Dec. 2003, pp. 451-467).*

* cited by examiner

*Primary Examiner* — George Giroux
(74) *Attorney, Agent, or Firm* — Seed IP Law Group PLLC (57) ABSTRACT

Embodiments of a processor architecture efficiently implement shadow registers in hardware. A register system in a processor includes a set of physical data registers coupled to register renaming logic. The register renaming logic stores data in and retrieves data from the set of physical registers when the processor is in a first processor state. The register renaming logic identifies ones of the set of physical registers that have a first operational state as a first group of registers and identifies the remaining ones of the set of physical registers as a second group of registers in response to an indication that the processor is to enter a second processor state from the first processor state. The register renaming logic stores data in and retrieves data from the second group of registers but not the first group of registers when the processor is in the second processor state.

35 Claims, 8 Drawing Sheets

Architectural Register Mapping Table (ARMT)

| Architectural Register | Physical Register Renamed to |
|---|---|
| 0 | 1 |
| 1 | 11 |
| 2 | 15 |
| 3 | 2 |
| 4 | 10 |
| 5 | 13 |
| 6 | 6 |
| 7 | 4 |

Physical Register Mapping Table (PRMT)

| Physical Register | Valid | Lock | AR | State |
|---|---|---|---|---|
| 0 | 0 | 0 | 7 | ET |
| 1 | 1 | 0 | 0 | CM |
| 2 | 1 | 0 | 3 | CM |
| 3 | 0 | 0 | 6 | ET |
| 4 | 1 | 0 | 7 | CM |
| 5 | 0 | 0 | 3 | ET |
| 6 | 1 | 0 | 6 | CM |
| 7 | 0 | 0 | 2 | ET |
| 8 | 0 | 0 | 1 | ET |
| 9 | 0 | 0 | 3 | ET |
| 10 | 1 | 0 | 4 | CM |
| 11 | 1 | 0 | 1 | CM |
| 12 | 0 | 0 | 5 | ET |
| 13 | 1 | 0 | 5 | CM |
| 14 | 0 | 0 | 3 | ET |
| 15 | 1 | 0 | 2 | CM |

1
APPARATUS UTILIZING EFFICIENT HARDWARE IMPLEMENTATION OF SHADOW REGISTERS AND METHOD THEREOF

CROSS-REFERENCE TO RELATED APPLICATION

This application claims priority from Chinese Patent Application No. 200910002807.8, filed on Jan. 24, 2009, entitled "A HARDWARE SAVED IMPLEMENTATION OF SHADOW REGISTERS," and which is incorporated herein by reference in its entirety.

BACKGROUND

1. Technical Field

This disclosure generally relates to the field of processor architecture and, more particularly, to register renaming using shadow registers in processors.

2. Description of the Related Art

In general, a processor is a device that can execute computer programs to carry out algorithmic computation, data permutation, etc. Microprocessors are a type of processor that incorporates most or all of the functions of a processor on a single integrated circuit. Superscalar microprocessors are microprocessors that can execute more than one instruction during a clock cycle by simultaneously dispatching multiple instructions to redundant execution resources, also known as functional units, in the processor. When executing instructions and micro-operations, processors typically read source operands from registers and store results or destination operands in registers. Registers are temporary storage units within the processor whose contents can be accessed more quickly than storage available elsewhere, and are typically used for holding arithmetic and other results used by the processor. A given register may contain a number of bits, e.g., 8 bits, 16 bits, or 32 bits, and is addressable by a respective register identifier, such as a register number.

The programs executed by a processor typically specify reads and writes to a limited set of registers as specified by the instruction set architecture, and this limited set of registers are known as the architectural registers. For example, a given instruction set architecture may specify 32 integer registers each 64-bit wide, and 32 floating-point registers each 64-bit wide. In such case, programs written for processors running this particular instruction set architecture will specify operations reading and writing to those 64 architectural registers.

In superscalar computing, a register renaming logic is typically used to rename, or map, architectural registers to corresponding physical registers so that more dependent instructions can be issued and executed while avoiding problems such as false data dependency. The number of physical registers is often larger than the number of architectural registers. For example, there may be twice as many physical registers as there are architectural registers in a given processor. An architectural register mapping table (ARMT) and a physical register mapping table (PRMT) are used to record the mapping relationships between the architectural registers and the physical registers. In particular, the ARMT records the physical register identifier of the physical register to which an architectural register is renamed, or mapped, to for each of the architectural registers. The PRMT records the status, operational state, and mapping relationship for each physical register of the set of physical registers.

Shadow registers are physical registers in processors that are typically used during debugging, exception, and interrupt. They provide temporary data storage upon the occurrence of a state, e.g., exception or interrupt, that changes the normal flow of execution of instructions. Traditionally, shadow registers are implemented in processors by the use of two sets of registers, or register files, with the processor using a first set of the two sets of registers during a normal state and using a second set of the two sets of registers, e.g., the shadow registers, during an abnormal state such as exception or interrupt. More specifically, when in the abnormal state, data stored in the first set of registers is copied to the second set of registers, or the shadow registers, for the processor to execute instructions using the second set of registers. When the processor returns to the normal state, data stored in the second set of registers is copied back to the first set of registers for the processor to operate on. For instance, the first set of registers may be used for renaming a number of architectural registers when the processor is in the normal state. When the processor enters the abnormal state due to exception or interrupt, the processor switches to using the second set of registers to rename those architectural registers. When the processor returns to the normal state again, it switches back to using the first set of registers to rename the architectural registers.

The switching back and forth between two sets of registers in the conventional implementation of shadow registers, however, is both time-consuming and power-consuming. In particular, time is consumed when data is copied from one set of registers to the other. Further, the operations of reading data from a source register, transmitting the data, and writing the data into destination register all consume power. Moreover, two sets of registers are needed to implement shadow registering even though only one set is used at any given time. Thus, the conventional implementation of shadow registers results in inefficient use of hardware, since one of the two sets of registers is not used at any given time.

BRIEF SUMMARY

In one aspect, a register system in a processor includes a set of physical registers to store data and register renaming logic coupled to the set of physical registers. Each physical register is identified by a corresponding physical register identifier and has one of a plurality of operational states. The register renaming logic stores data in and retrieves data from the set of physical registers when the processor is in a first processor state. The register renaming logic identifies ones of the set of physical registers that have a first operational state as a first group of registers and identifies the remaining ones of the set of physical registers as a second group of registers in response to an indication that the processor is to enter a second processor state from the first processor state. When the processor is in the second processor state, the register renaming logic stores data in and retrieves data from the second group of registers but not the first group of registers.

In one aspect, a processor includes a set of physical registers to store data, an architectural register mapping table (ARMT) having a plurality of ARMT entries each corresponding to a respective architectural register, a physical register mapping table (PRMT) having a plurality of PRMT entries each corresponding to a respective one of the physical registers, and a register renaming logic operable to set the ARMT entries and the PRMT entries and to store data in the physical registers. Each physical register is identified by a corresponding physical register identifier and having one of a plurality of operational states. Each ARMT entry records the physical register identifier of a respective one of the physical registers that the corresponding architectural register is renamed to. Each PRMT entry has a state field indicative of one of the operational states the corresponding physical register is in and an AR field indicative of a respective architectural register that is renamed to the corresponding physical register. The register renaming logic distinguishes a first group of the physical registers that are in a first operational state from a second group of the physical registers that are in one of the operational states other than the first operational state before the processor enters a second processor state from a first processor state. The register renaming logic utilizes the second group of the physical registers for architectural register renaming while maintaining data stored in the first group of the physical registers and the respective PRMT entries unchanged when the processor is in the second processor state.

In one aspect, a processor-based system includes an input device, an output device, a data storage device, and a processor coupled to the input device, the output device, and the data storage device. The processor includes a set of physical registers to store data and a register renaming logic coupled to the set of physical registers. Each physical register is identified by a corresponding physical register identifier and having one of a plurality of operational states. The register renaming logic stores data in and retrieves data from the set of physical registers when the processor is in a first processor state. The register renaming logic identifies ones of the set of physical registers having a first operational state as a first group of registers and identifies the other ones of the set of physical registers as a second group of registers in response to an indication that the processor is entering a second processor state from the first processor state. When the processor is in the second processor state, the register renaming logic stores data in and retrieves data from the second group of registers while maintaining data stored in the first group of registers and the respective PRMT entries unchanged.

In one aspect, a method utilizes a set of physical registers each storing data for register renaming in a processor. The method alters the data stored in a first physical register from among the set of physical registers to rename a first architectural register to the first physical register when the processor is in a first processor state. The method detects that the processor is to enter a second processor state from the first processor state. A respective operational state of each physical register of the set of physical registers is determined in response to detecting that the processor is to enter the second processor state from the first processor state. Those physical registers of the set of physical registers having a first operational state are identified as a first group of physical registers and those physical registers of the set of physical registers having an operational state other than the first operational state are identified as a second group of physical registers in response to detecting that the processor is to enter the second processor state from the first processor state. The method alters the data stored in a second physical register from among the second group of physical registers to rename a second architectural register to the second physical register of the second group of physical registers when the processor is in the second processor state. The method maintains the data stored in the first group of physical registers when the processor is in the second processor state.

In another aspect, a method utilizes a set of physical registers in a processor for register renaming. The method selects a first physical register from the set of physical registers to rename a first architectural register to the first physical register when the processor is in a first processor state. The method records an identifier of the first architectural register in a first field of a physical register mapping table (PRMT) entry associated with the first physical register. The method updates a second field of the PRMT entry associated with the first physical register to indicate one of a plurality of operational states the first physical register is in. The method detects that the processor is to enter a second processor state, and updates a third field of the PRMT entry associated with each of the physical registers having a first operational state to label the respective physical register in response to detecting that the processor is to enter the second processor state. The method further selects a second physical register from the set of physical registers other than the labeled physical registers to rename a second architectural register to the second physical register when the processor is in the second processor state.

In the drawings, identical reference numbers identify similar elements or acts. The sizes and relative positions of elements in the drawings are not necessarily drawn to scale. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with register renaming systems, processors, and processor-based systems have not been shown or described in detail to avoid unnecessarily obscuring descriptions of the embodiments.

Figure 1:
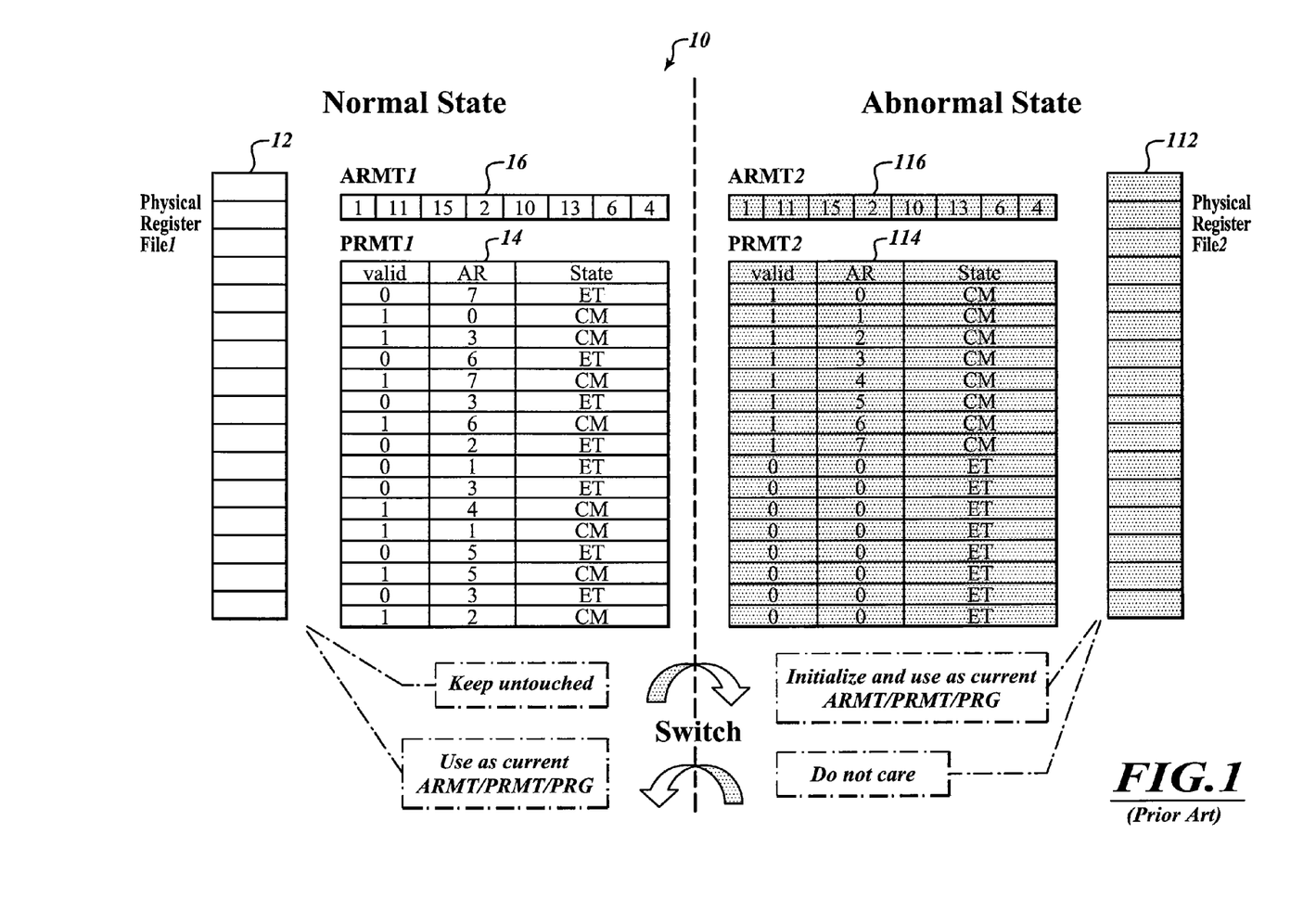
FIG. 1 is a simplified diagram of a conventional implementation of shadow registers in a processor.

FIG. 1 illustrates a conventional implementation 10 of shadow registers in a processor.

The conventional implementation 10 utilizes a first register system that includes a first set of physical registers 12, a corresponding physical register mapping table (PRMT) 14, and an architectural register mapping table (ARMT) 16. Each physical register of the first set of physical registers 12 can store data, for example, an operand or an instruction. Each physical register is identified by a respective physical register identifier. For instance, each of the sixteen physical registers of the first set of physical registers 12 is assigned a corresponding number so that the physical registers are identified as physical register 0, physical register 1, and so on. Likewise, each architectural register (not shown) is identified by a respective architectural register identifier. Each entry of the ARMT 16 corresponds to a respective architectural register, and records the physical register identifier of the latest physical register that the respective architectural register is renamed to.

Each entry of the PRMT 14 corresponds to a respective one of the physical registers of the first set 12, and has a validity field, an architectural register (AR) field, and a state field. Each entry of the PRMT 14 records a validity value, an architectural register identifier of an architectural register that is renamed to the corresponding physical register of the first set 12, and one of a plurality of operational states the respective physical register is in. The validity field records a validity value that indicates whether or not the corresponding physical register is the latest physical register that the architectural register identified by the recorded architectural register identifier is renamed to. For example, a binary value of 1 in the validity field of a PRMT entry indicates that the corresponding physical register is the latest physical register that the architectural register identified by the recorded architectural register identifier is renamed to, while a binary value of 0 indicates otherwise. The AR field records the architectural register identifier of the architectural register that is renamed to the physical register of the first set 12 corresponding to this particular PRMT entry. The state field indicates the operational state of the corresponding physical register based on which pipeline stage the corresponding physical register is currently in. Accordingly, the operational states include empty (ET), renamed (RD), write-back (WT), and commit (CM).

The conventional implementation 10 also utilizes a second register system that includes a second set of physical registers 112, a corresponding PRMT 114, and an ARMT 116 to duplicate the first set of physical registers 12, the PRMT 14, and the ARMT 16, respectively. That is, the second set of physical registers 112 is a set of shadow registers for the first set of physical registers 12. The structure and functionality of each of the second set of physical registers 112, the PRMT 114, and the ARMT 116 are similar to those of its respective counterpart, and thus will not be described again in the interest of brevity.

When the processor is in a normal state of operation, register renaming for the architectural registers is performed using the physical registers of the first set of physical registers 12. Therefore, the physical registers of the second set 112, as well as the associated PRMT 114 and ARMT 116, are not used in the normal state. During an exception or interrupt, however, the processor enters an abnormal state of operation and switches to using the physical registers of the second set of physical registers 112 to rename the architectural registers. More specifically, when the onset of an exception or interrupt is detected, the validity field of each of the entries of the PRMT 14 that indicate the corresponding physical registers are not in the commit state (CM) is set to 0, and the state field of each of those entries is set to indicate the empty state (ET). The first set of physical registers 12 and the ARMT 16 are maintained unchanged when the processor is in the abnormal state. The second register system is initialized, and the architectural registers are renamed to the corresponding physical registers of the second set 112 (e.g., if an architectural register is renamed to register 5 of the first set 12, it is now renamed to register 5 of the second set 112). All the entries of the ARMT 116 and the entries of the PRMT 114 corresponding to the physical registers of the second set 112 that are mapped to the architectural registers are populated with the data recorded in the respective entries in the ARMT 16 and the PRMT 14. The state field of each of the entries of the PRMT 114 corresponding to the unused physical registers of the second set 112 is set to indicate the empty state (ET). Then, the processor switches to use the second register system for register renaming in the abnormal state.

In the abnormal state, register renaming is performed using the second set of physical registers 112, the PRMT 114, and the ARMT 116. All of the entries of the ARMT 116 need to be refilled when the instructions being executed in the abnormal state require register renaming. When the processor returns to the normal state, it switches to using the first register system for register renaming, and the second register system will be unused until the next time the processor enters the abnormal state.

As can be seen, the convention implementation 10 of shadow registers requires two sets of hardware to implement the two sets of physical registers and the mapping tables even though only one set is used at any given time. Although the switching between the first register system and the second register system may be implemented by using a multiplexer to select between the two or by copying data from the first register system to the second register system, either way inevitably consumes time and power.

Figure 2A:
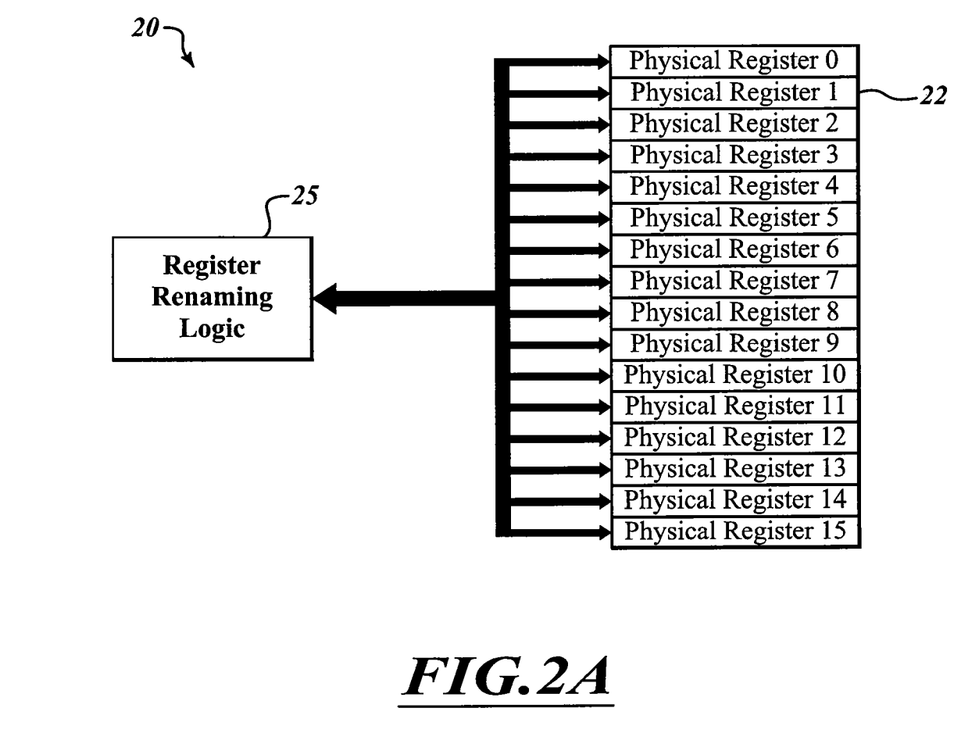
FIG. 2A is a simplified block diagram of a register system in a processor according to one non-limiting embodiment.

FIG. 2A illustrates a simplified block diagram of a register system 20 in a processor according to one embodiment.

In one embodiment, the register system 20 may include a set of physical registers 22 and a register renaming logic 25. Although the set of physical registers 22 shown in FIG. 2A includes sixteen physical registers, physical register 0 through physical register 15, it may include a different number of physical registers in other embodiments. Each physical register of the set 22 may be in one of a plurality of operational states, including, for example, empty (ET), renamed (RD), write-back (WT), and commit (CM).

The register renaming logic 25 is coupled to the set of physical registers 22. In one embodiment, when the processor is in the normal state, the register renaming logic 25 stores data in and retrieves data from any or all of the set of physical registers 22 in renaming a plurality of architectural registers to a number of physical registers of the set of physical registers 22. When the onset of an abnormal state is detected, the register renaming logic 25 identifies those physical registers of the set 22 that are in the commit state (CM) as a first group of the physical registers and those other physical registers of the set 22 that are not in the commit state as a second group of the physical registers. In other words, those physical registers in the commit state when the onset of the abnormal state is detected are in the first group, and those physical registers in any of the other operational states when the onset of the abnormal state is detected are in the second group. When the processor is in the abnormal state, the register renaming logic 25 stores data in and retrieves data from only the physical registers of the second group but not the first group in renaming the plurality of architectural registers.

Thus, when in the normal state, the entire set of physical registers 22 is available for the register renaming logic 25 to rename the architectural registers to. When in the abnormal state, however, the register renaming logic 25 renames the architectural registers using a subset of the physical registers, namely those physical registers of the set 22 that are not in the commit state when the onset of the abnormal state is detected. The data stored in the physical registers in the first group, i.e., those physical registers that are in the commit state when the onset of the abnormal state is detected, is maintained unchanged when the processor is in the abnormal state. This allows the processor to continue the normal flow of execution of instructions by resuming the use of those physical registers in the first group, and the data stored therein, for register renaming when the processor returns to the normal state.

In one embodiment, only one set of physical registers, the set of physical registers 22, is used in this inventive implementation of shadow registers. In particular, given the fact that there are typically more physical registers than the architectural registers by a factor of two or more and that a processor typically utilizes fewer physical registers when it is in the abnormal state, the register renaming logic 25 uses some of the physical register in the set 22 in the normal state and some of the other physical registers in the set 22 in the abnormal state for register renaming. Consequently, because only one set of physical registers can be used in both the normal and abnormal states, embodiments of the register system 20 do not require switching back and forth between two sets of physical registers when the processor changes between states.

Figure 2B:
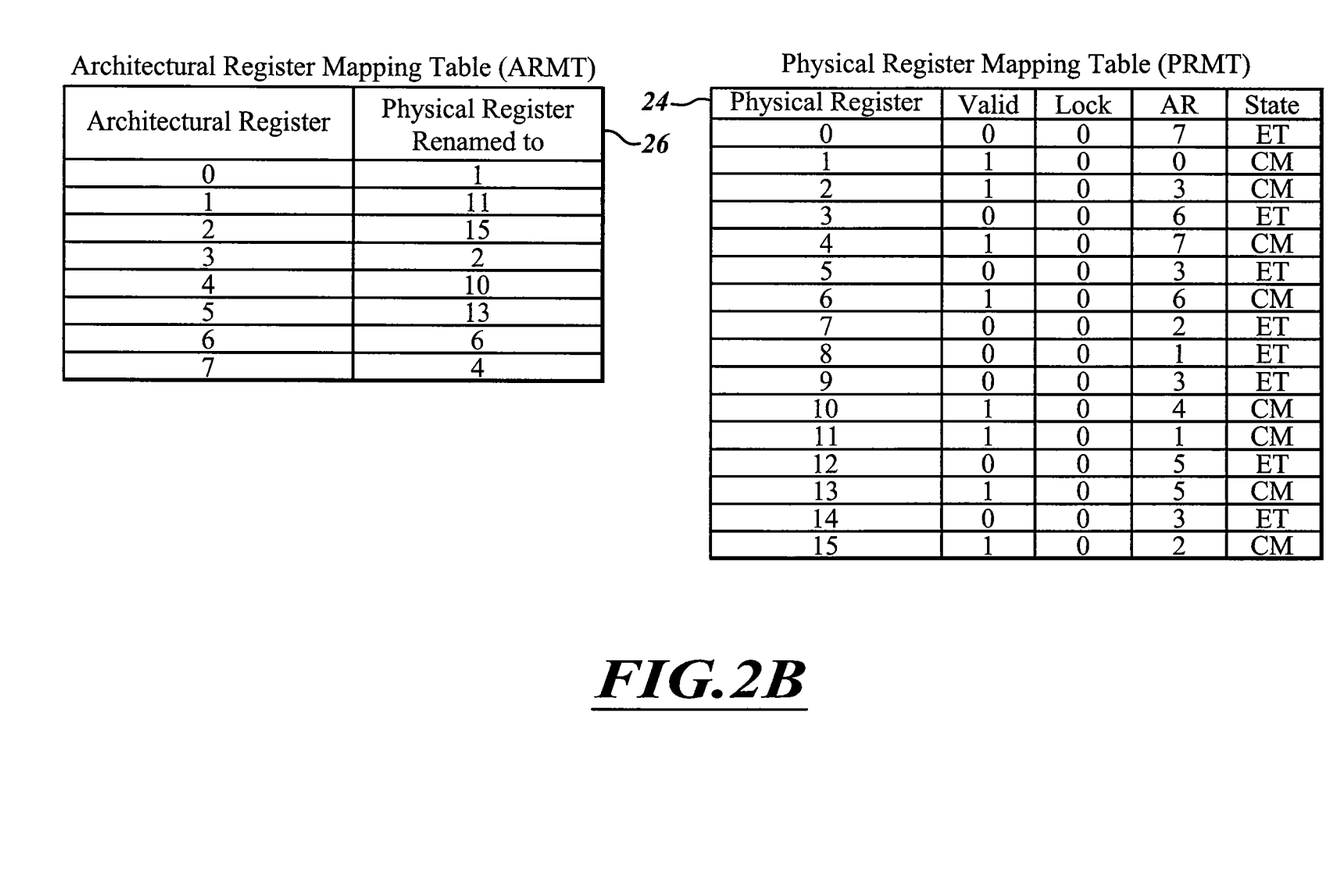
FIG. 2B is a diagram of mapping tables of the register system of FIG. 2A according to one non-limiting embodiment.

FIG. 2B illustrates the mapping tables, PRMT 24 and ARMT 26, of the register system 20 according to one embodiment.

In one embodiment, each entry of the PRMT 24 has a validity field, a lock field, an AR field, and a state field. The validity field, the AR field, and the state field are similar to those in the PRMT 14 and, therefore, will not be described again in the interest of brevity. Similar to the entries of the ARMT 16, each entry of the ARMT 26 records the identifier of the respective physical register, e.g., the physical register number, which the corresponding architectural register is renamed to.

Figure 3:
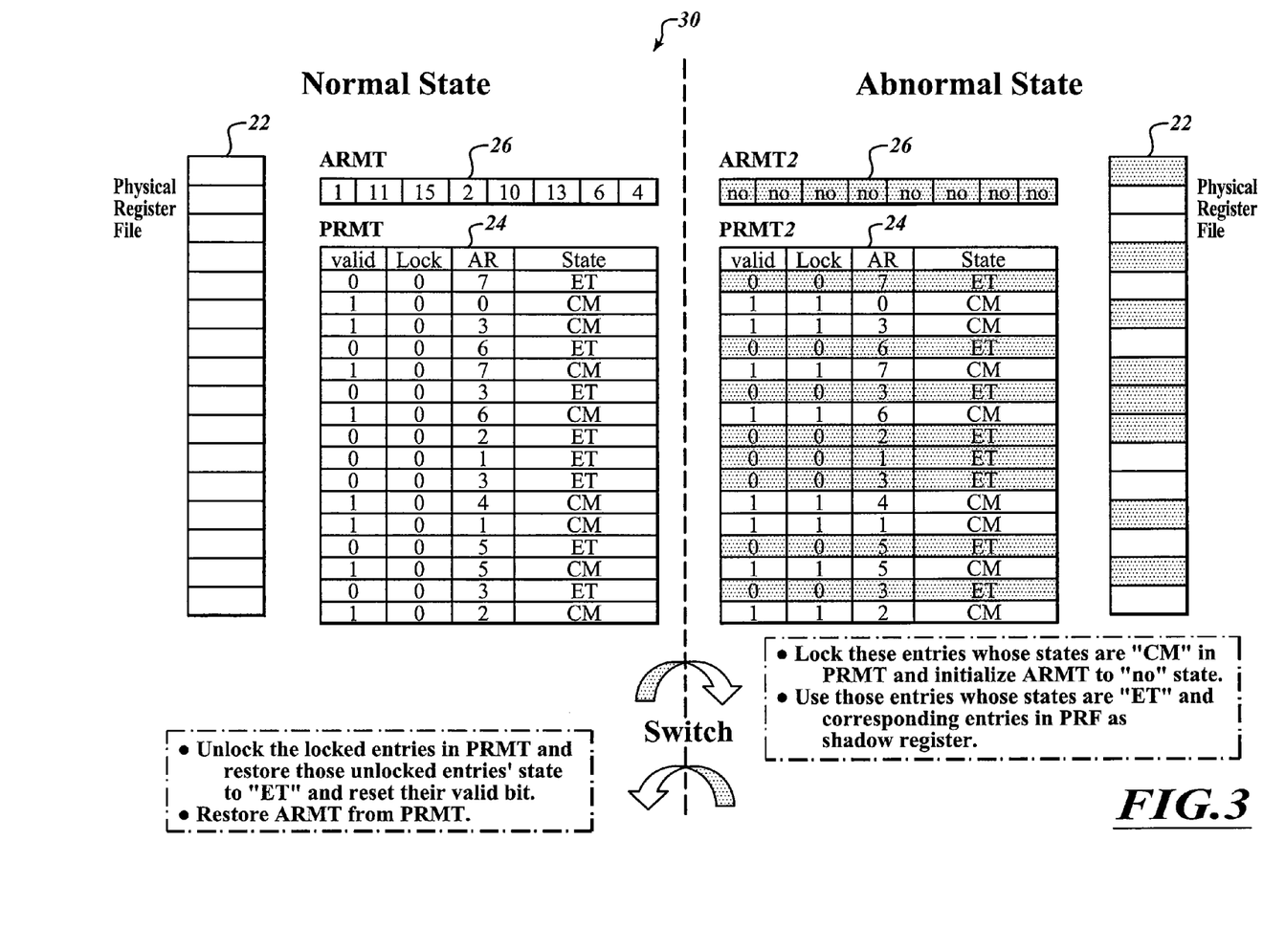
FIG. 3 is a simplified diagram of an implementation of shadow registers according to one non-limiting embodiment.

FIG. 3 illustrates an implementation 30 of shadow registers using the register system 20 of FIGS. 2A and 2B according to one embodiment.

FIG. 3 shows a snapshot of the set of physical registers 22, the PRMT 24, and the ARMT 26 when they are in the normal state and when they are in the abnormal state. Further description of the register system 20 is provided below in reference to FIG. 2A, FIG. 2B, and FIG. 3.

The lock field of a given entry of the PRMT 24 is set by the register renaming logic 25 to label the respective physical register to distinguish the corresponding physical register from one or more of the other physical registers of the set 22. In one embodiment, the register renaming logic 25 sets the lock field of each entry of the PRMT 24 to the binary value of 0 to 'unlock' all the physical registers of the set 22 when the processor is in the normal state. When the register renaming logic 25 selects physical registers from the set 22 to rename architectural registers to, it selects only those physical registers that are in the unlocked status. Those physical registers that have an unlocked status as indicated by the respective lock field are therefore available for selection. In other words, when the processor is in the normal state, all of the physical registers of the set 22 are available for register renaming when the processor is in the normal state.

When the onset of the abnormal state is detected, the register renaming logic 25 identifies those physical registers of the set 22 that are in the commit state and sets the lock field of each of these identified physical registers to the binary value of 1 to 'lock' these physical registers. Thus, when the onset of the abnormal state is detected, those physical registers in the commit state set are set to a locked status while the rest of the physical registers of the set 22, which are in one of the operational states other than the commit state, remain in the unlocked status. During the abnormal state, only those physical registers that are in the unlocked status are available for the register renaming logic 25 to select from for register renaming. The data stored in those physical registers that are locked, as well as the entries of the PRMT 24 corresponding to those locked physical registers, remain unchanged during the abnormal state. When the onset of the normal state is detected, the register renaming logic 25 resets the lock field to the binary value of 0 for each of the locked physical registers because, when in the normal state, all physical registers of the set 22 are available for register renaming.

In one embodiment, in addition to updating the lock field as the processor changes between normal and abnormal states, the register renaming logic 25 also updates the validity field and the state field of entries of the PRMT 24, and entries of the ARMT 26, in response to the processor changing from one state to the other.

In an embodiment, the register renaming logic 25 resets the respective validity field to the value of 0 for each of the physical registers that are not in the commit state, i.e., the unlocked physical registers, when the onset of the abnormal state is detected. The register renaming logic 25 also sets the respective state field to indicate an empty state (ET) for each of the unlocked physical registers. The register renaming logic 25 additionally sets the entries of the ARMT 26 to a null value or, alternatively, sets the entries of the ARMT 26 to a physical register identifier outside the range of the available physical registers of the set 22 to initialize these entries. As the instructions being executed in the abnormal state require renaming of the architectural registers, the entries of the ARMT 26 will be refilled with appropriate physical register identifiers of those unlocked physical registers of the set 22. When it is detected that the processor is to return to the normal state, the register renaming logic 25 resets the respective validity field to the value of 0 and set the respective state field to indicate an empty state for each of the unlocked physical registers. These actions, coupled with the resetting of the lock field to the value of 0 for each of the locked physical registers, restore the PRMT 24 for operation in the normal state.

In one embodiment, in preparation for returning to the normal state, the register renaming logic 25 restores the ARMT 26 by utilizing the correlation, or renaming relation, recorded in the entries of the PRMT 24 associated with those locked physical registers. Particularly, the register renaming logic 25 may repopulate a given entry of the ARMT 26 by recording in that entry the physical register identifier of the entry of the PRMT 24 that records the architectural register identifier in its AR field. The register renaming logic 25 may continue to do so until all the entries of the ARMT 26 are restored to where they were before the processor entered the abnormal state.

Figure 4:
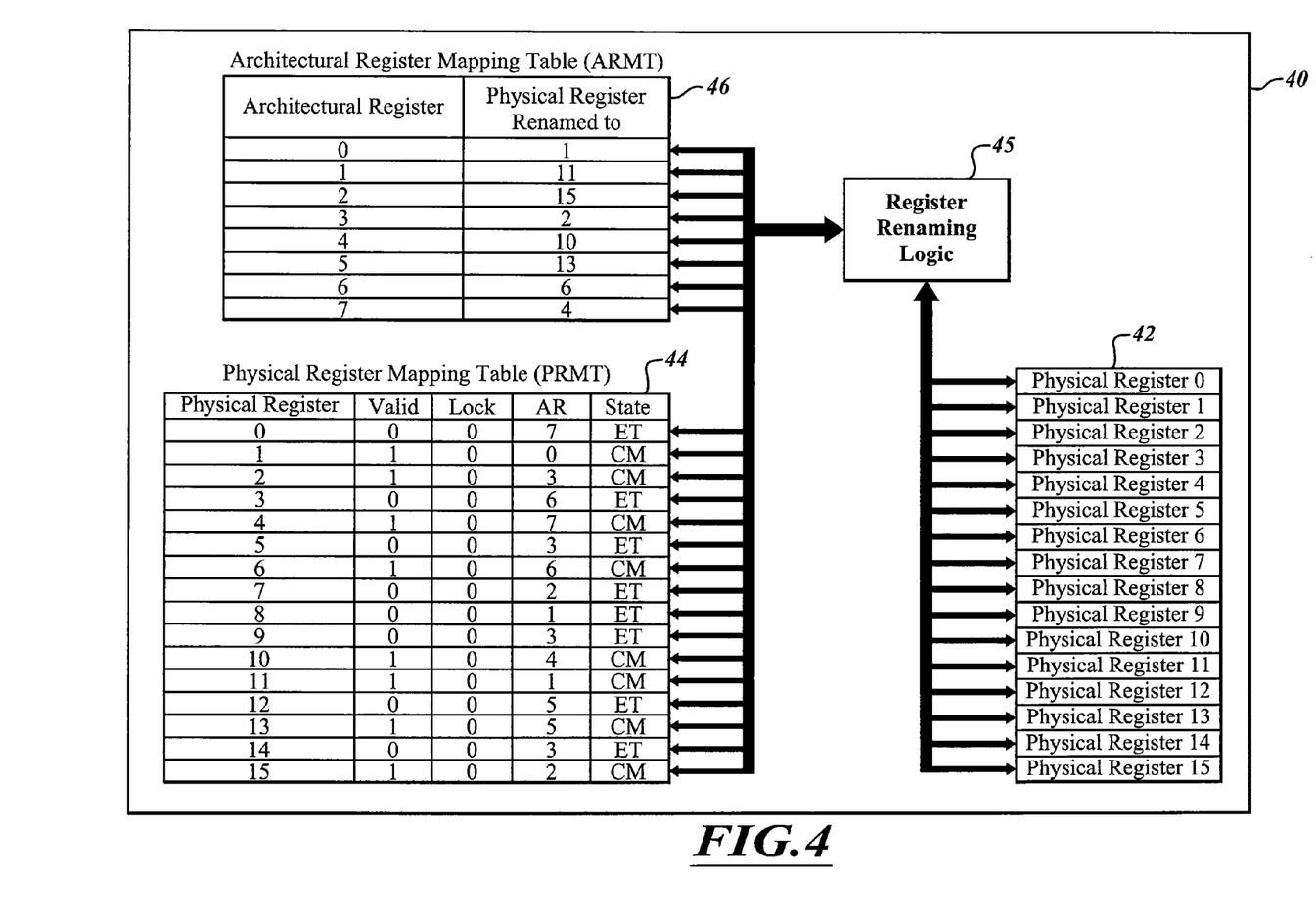
FIG. 4 is a simplified block diagram of a processor according to one non-limiting embodiment.

FIG. 4 illustrates a simplified block diagram of a processor 40 according to one embodiment.

In one embodiment, the processor 40 may include a set of physical registers 42, a PRMT 44, an ARMT 46, and a register renaming logic 45 that is coupled to the set of physical registers 42, the PRMT 44, and the ARMT 46. The set of physical registers 42 may be similar to the set of physical registers 22. More specifically, each physical register of the set 42 is identified by a corresponding physical register identifier and has one of a plurality of operational states, including empty, renamed, write-back, and commit. The ARMT 46 may be similar to the ARMT 26, where each entry of the ARMT 46 records the physical register identifier of a respective one of the physical registers of the set 42 that the corresponding architectural register is renamed to.

In one embodiment, the PRMT 44 has a plurality of entries each corresponding to a respective one of the physical registers of the set 42. Each entry of the PRMT 44 has a state field indicative of one of the operational states the corresponding physical register is in and an AR field indicative of a respective architectural register that is renamed to the corresponding physical register. In one embodiment, each entry of the PRMT 44 may additionally have a validity field and a lock field. The validity field may be set to a first validity value, e.g., a binary value of 1, to indicative that the corresponding physical register is the latest one of the physical registers that the architectural register indicated in the AR field is renamed to. Alternatively, the validity field may be set to a second validity value, e.g., a binary value of 0, to indicate that the corresponding physical register is not the latest one of the physical registers that the architectural register indicated in the AR field is renamed to. The lock field may be set to indicate whether or not the corresponding physical register is identified as one of the physical registers in a first group of the physical registers. In one embodiment, the physical registers of the first group have a locked status while the rest of the physical registers of the set 42 have an unlocked status.

The register renaming logic 45 sets and updates the entries of the PRMT 44 and the ARMT 46. It also stores data in and retrieves data from the set of physical registers 42. In one embodiment, before the processor enters a second processor state, one example of which is an abnormal state, from a first processor state, one example of which is a normal state, the register renaming logic 45 distinguishes the first group of the physical registers that are in a first operational state, for example, the commit state, from a second group of the physical registers that are in one of the operational states other than the first operational state. When the processor is in the second processor state, the register renaming logic 45 utilizes only the second group of the physical registers for architectural register renaming while maintaining data stored in the first group of the physical registers and the respective entries of the PRMT 44 unchanged.

In one embodiment, when the register renaming logic 45 receives an indication that the processor is entering the second processor state from the first processor state, it sets the validity field to the second validity value for each physical register of the second group of the physical registers. The register renaming logic 45 also sets the state field of the respective entry of the PRMT 44 of each physical register of the second group to indicate an empty state in response to receiving the indication that the processor is entering the second processor state from the first processor state.

In one embodiment, the register renaming logic 45 sets the lock field of each entry of the PRMT 44 to a first lock value, e.g., a binary value of 0, to unlock the respective PRMT entry and the corresponding physical register when the processor is in the first processor state. The register renaming logic 45 also sets the lock field of the respective entry of the PRMT 44 for each physical register of the first group to a second lock value, e.g., a binary value of 1, to lock the respective PRMT entry in response to receiving the indication that the processor is entering the second processor state from the first processor state. When the processor is in the second processor state, the register renaming logic 45 stores data in and retrieves data from only those physical registers whose respective PRMT entries indicate an unlocked status for the corresponding physical registers.

In one embodiment, in response to receiving the indication that the processor is entering the first processor state from the second processor state, the register renaming logic 45 sets the state field of the respective entry of the PRMT 44 for each physical register of the second group to indicate an empty state before the processor enters the first processor state from the second processor state. The register renaming logic 45 also sets the validity field of the respective entry of the PRMT 44 for each physical register of the second group to the second validity value before the processor enters the first processor state from the second processor state. The register renaming logic 45 sets the lock field of the respective PRMT entry of each physical register of the second group of the physical registers to the first lock value to unlock the respective PRMT entry before the processor enters the first processor state from the second processor state in response to receiving the indication that the processor is entering the first processor state from the second processor state.

In one embodiment, the register renaming logic 45 resets each entry of the ARMT 46 before the processor enters the second processor state from the first processor state in response to receiving an indication that the processor is entering the second processor state from the first processor state. For example, the register renaming logic 45 sets the entries of the ARMT 46 to a null value or, alternatively, sets the entries of the ARMT 46 to a physical register identifier outside the range of the available physical registers of the set 42 to initialize these entries. In response to receiving an indication that the processor is entering the first processor state from the second processor state, the register renaming logic 45 restores the respective physical register identifier recorded in each entry of the ARMT 46 based on the AR field of each one of the entries of the PRMT 44 corresponding to the physical registers in the first group of the physical registers before the processor returns to the first processor state.

Figure 5:
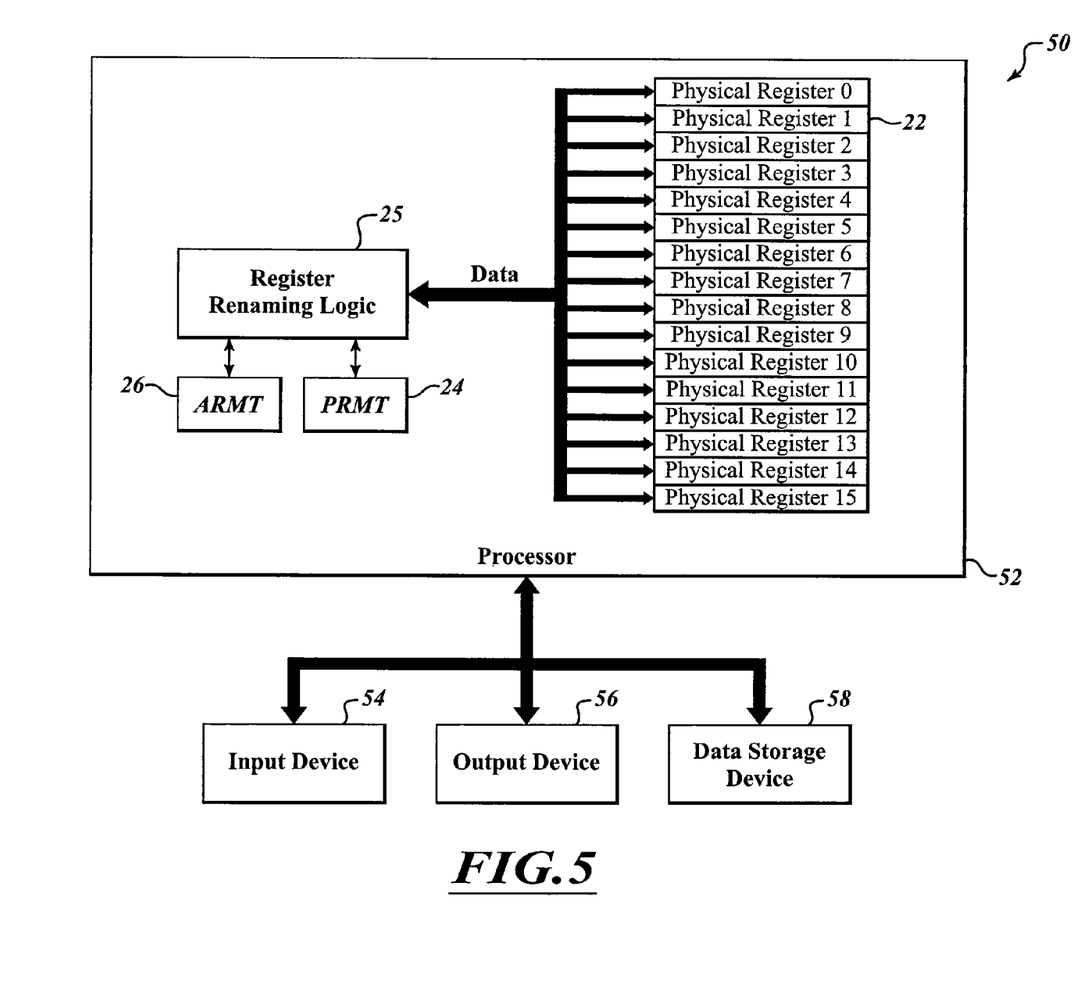
FIG. 5 is a simplified block diagram of a processor-based system according to one non-limiting embodiment.

FIG. 5 illustrates a simplified block diagram of a processor-based system 50 that incorporates an implementation of shadow registers in accordance with one embodiment.

In one embodiment, the processor-based system 50 includes an input device 54, an output device 56, a data storage device 58, and a processor 52 coupled to the input device 54, the output device 56, and the data storage device 58. In one embodiment, the processor 52 may include the register system 20 of FIGS. 2A and 2B. In particular, the processor 52 may include the set of physical registers 22, the PRMT 24, the ARMT 26, and the register renaming logic 25 coupled to the set of physical registers 22, the PRMT 24, and the ARMT 26. The structure and operation of the register system 20 have been described above. The input device 54, the output device 56, and the data storage device 58 are well known in the art and, in the interest of brevity, an explanation of the structure and operation of these components will not be provided.

Figure 6:
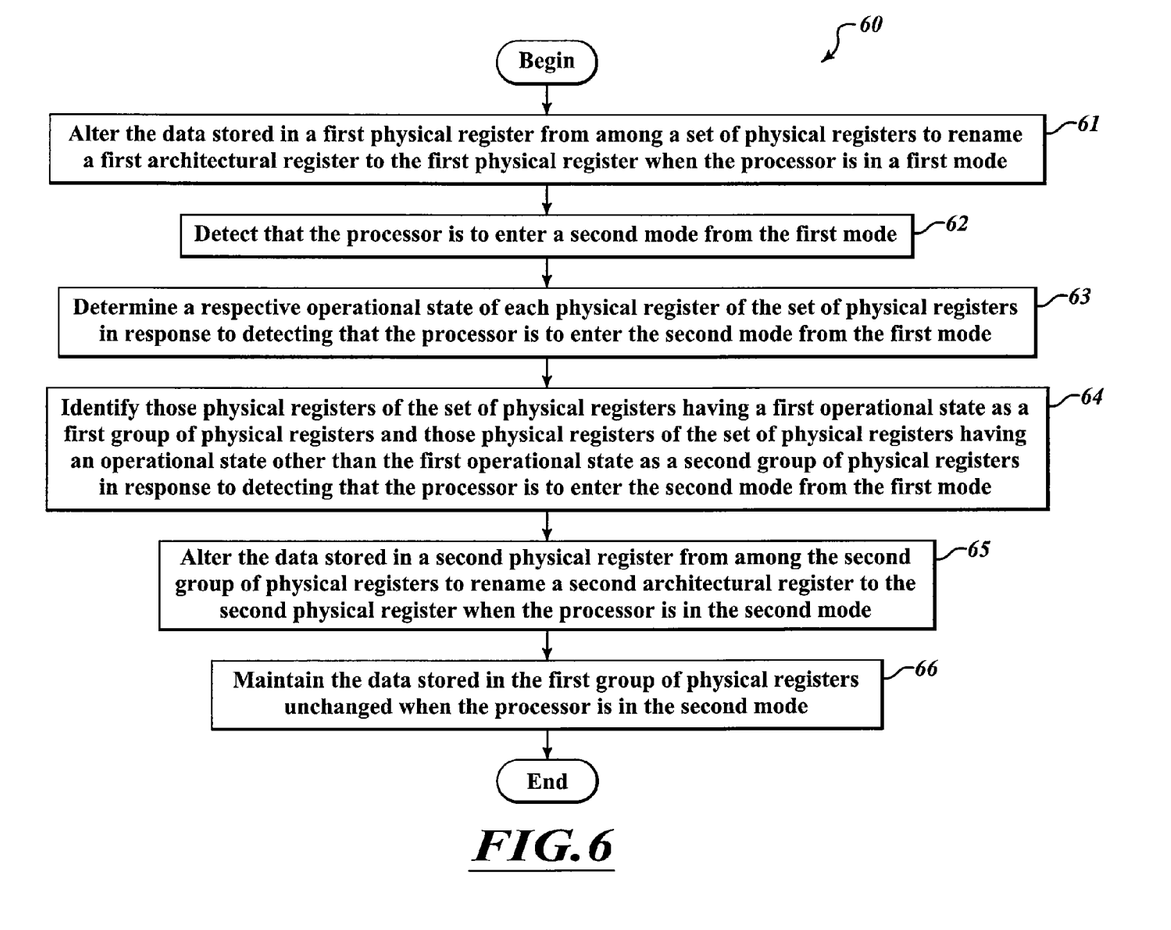
FIG. 6 is a flow chart of a process of utilizing a set of physical registers in a processor for register renaming according to one non-limiting embodiment.

FIG. 6 illustrates a process 60 of utilizing a set of physical registers in a processor for register renaming according to one non-limiting embodiment.

At 61, the process 60 alters data stored in a first physical register from among the set of physical registers to rename a first architectural register to the first physical register when the processor is in a first processor state. At 62, the process 60 detects that the processor is to enter a second processor state from the first processor state. At 63, the process 60 determines a respective operational state of each physical register of the set of physical registers in response to detecting that the processor is to enter the second processor state from the first processor state. At 64, the process 60 identifies those physical registers of the set of physical registers having a first operational state as a first group of physical registers and those physical registers of the set of physical registers having an operational state other than the first operational state as a second group of physical registers in response to detecting that the processor is to enter the second processor state from the first processor state. At 65, the process 60 alters data stored in a second physical register from among the second group of physical registers to rename a second architectural register to the second physical register of the second group of physical registers when the processor is in the second processor state. At 66, the process 60 maintains data stored in the first group of physical registers when the processor is in the second processor state.

In one embodiment, the process 60 sets the respective operational state of each physical register of the second group of physical registers to a second operational state in response to detecting that the processor is to enter the second processor state from the first processor state. The process 60 may further detect that the processor is to return to the first processor state from the second processor state and, in response to detecting that the processor is to return to the first processor state from the second processor state, set the respective operational state of each physical register of the second group of physical registers to the second operational state.

In another embodiment, the process 60 performs a number of tasks in altering data stored in the first physical register from among the set of physical registers to rename the first architectural register to the first physical register. For example, the process 60 may select the first physical register from the set of physical registers to rename the first architectural register to the first physical register. An identifier of the first physical register is recorded in an ARMT entry associated with the first architectural register, and an identifier of the first architectural register is recorded in a PRMT entry associated with the first physical register. The process 60 may also store data associated with the first architectural register in the first physical register, and update a state field of the PRMT entry associated with the first physical register to indicate one of a plurality of operational states the first physical register is in.

In yet another embodiment, the process 60 may set a lock field of the PRMT entry associated with each physical register of the set of physical registers to indicate an unlocked status when the processor is in the first processor state. In another embodiment, the process 60 may update a lock field of the PRMT entry associated with each of the physical registers identified as having the first operational state to indicate a locked status in response to detecting that the processor is to enter the second processor state from the first processor state. In yet another embodiment, the process 60 performs a number of tasks in altering data stored in a second physical register from among the second group of physical registers to rename a second architectural register to the second physical register of the second group of physical registers when the processor is in the second processor state. For example, the process 60 may select the second physical register from the second group of physical registers to rename the second architectural register to the second physical register, record an identifier of the second physical register in an ARMT entry associated with the second architectural register, and record an identifier of the second architectural register in a PRMT entry associated with the second physical register. The process 60 may further store data associated with the second architectural register in the second physical register, and update the state field of the PRMT entry associated with the second physical register to indicate one of a plurality of operational states the second physical register is in.

Figure 7:
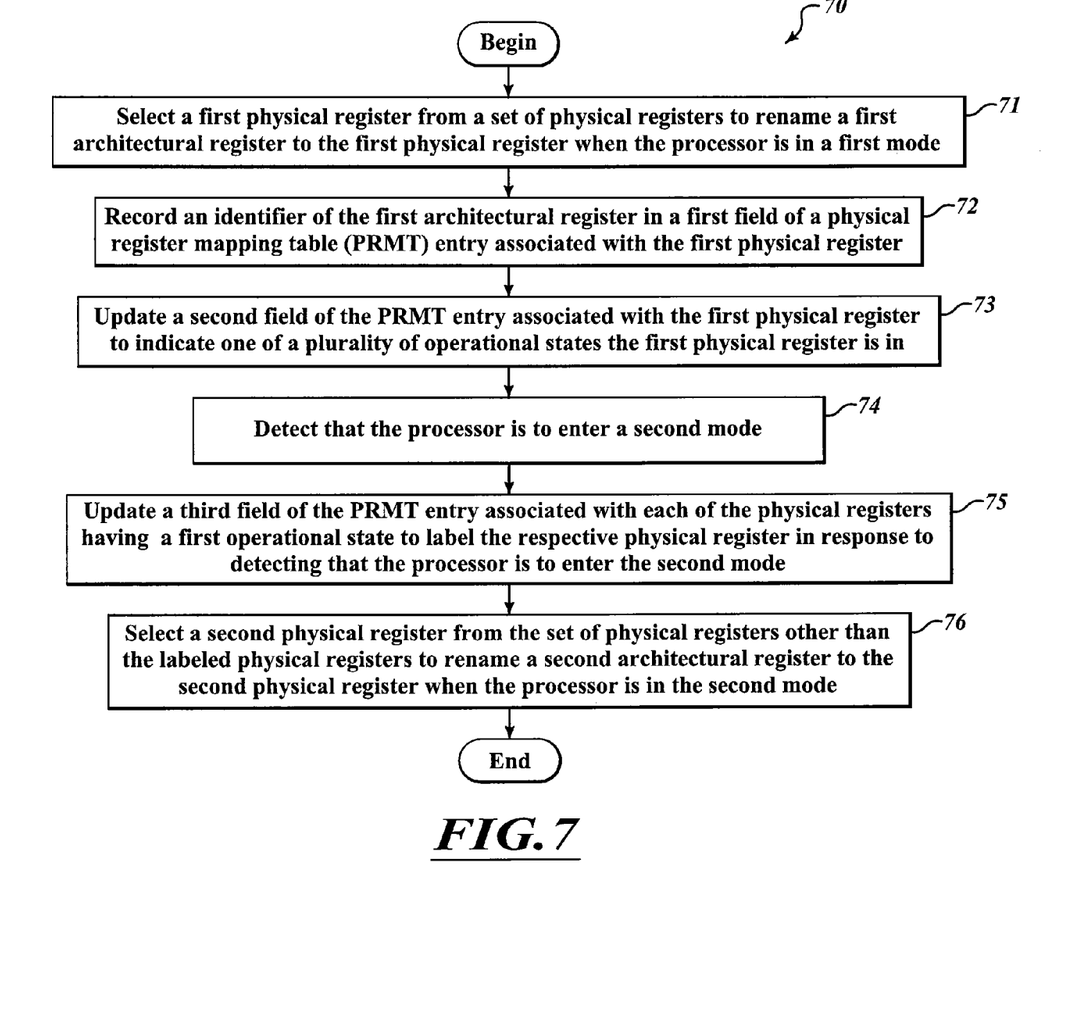
FIG. 7 is a flow chart of a process of utilizing a set of physical registers in a processor for register renaming according to another non-limiting embodiment.

FIG. 7 illustrates a process 70 of utilizing a set of physical registers in a processor for register renaming according to another non-limiting embodiment.

At 71, the process 70 selects a first physical register from the set of physical registers to rename a first architectural register to the first physical register when the processor is in a first processor state. At 72, an identifier of the first architectural register is recorded in a first field of a PRMT entry associated with the first physical register. At 73, a second field of the PRMT entry associated with the first physical register is updated to indicate one of a plurality of operational states the first physical register is in. At 74, the process 70 detects that the processor is to enter a second processor state. At 75, a third field of the PRMT entry associated with each of the physical registers having a first operational state is updated to label the respective physical register in response to detecting that the processor is to enter the second processor state. At 76, a second physical register from the set of physical registers other than the labeled physical registers is selected to rename a second architectural register to the second physical register when the processor is in the second processor state.

In one embodiment, the process 70 may set the third field of the PRMT entry associated with each of the physical registers to a first value when the processor enters the first processor state, and update the third field of the PRMT entry associated with each of the physical registers having a first operational state to a second value different from the first value to label the respective physical register in response to detecting that the processor is to enter the second processor state. The process 70 may also detect that the processor is to return to the first processor state from the second processor state, and reset the third field of the PRMT entry associated with each of the labeled physical registers to the first value in response to detecting that the processor is to return to the first processor state from the second processor state. In addition, the process 70 may further select a third physical register from the set of physical registers to rename a third architectural register to the third physical register after the processor returns to the first processor state from the second processor state, and record an identifier of the third architectural register in the first field of the PRMT entry associated with the third physical register.

In another embodiment, the process 70 may record an identifier of the first physical register in an ARMT entry associated with the first architectural register to rename the first architectural register to the first physical register, and reset the ARMT entry associated with the first architectural register in response to detecting that the processor is to enter the second processor state. The process 70 may also detect that the processor is to return to the first processor state from the second processor state, and, in response, restoring the ARMT entry associated with the first architectural register by recording in the ARMT entry associated with the first architectural register the identifier of the physical register the first architectural register was renamed to before the processor enters the second processor state.

In yet another embodiment, the process 70 may update the second field of the PRMT entry associated with each of the physical registers having the first value in the third field to indicate a second operational state in response to detecting that the processor is to enter a second processor state. The process 70 may detect that the processor is to return to the first processor state from the second processor state. In response to detecting that the processor is to return to the first processor state from the second processor state, the process 70 may update the second field of the PRMT entry associated with each of the physical registers having the first value in the third field to indicate a second operational state.

Thus, embodiments of an inventive scheme to implement shadow registers in processors, such as superscalar microprocessors, have been disclosed. The implementation scheme according to the various embodiments disclosed herein provides several advantages over the conventional implementation of shadow registers, such as the implementation 10 shown in FIG. 1. For instance, only one set of physical registers is used for register renaming during the normal state and during the abnormal state with some of the physical registers of the set utilized as shadow registers. This eliminates the need of a duplicate set of physical registers for use as shadow registers and a duplicate set of corresponding PRMT and ARMT. Processor performance can be improved as there is no time wasted in switching between two sets of registers. Power consumption is also reduced accordingly.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other context, not necessarily the exemplary context of register renaming generally described above. It will be understood by those skilled in the art that, although the embodiments described above and shown in the figures are generally directed to the context of register renaming, applications related to the use of physical registers in the processor may also benefit from the concepts described herein.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:

1. A register system in a processor, comprising:
a single physical register file configured to store data, each physical register identifiable by a corresponding physical register identifier and configured to take one of a plurality of operational states; and
register renaming logic coupled to the single physical register file, the register renaming logic configured to:
initialize a plurality of indicators, at least one indicator corresponding to each physical register, said indicators arranged to control access to each physical register based at least in part on one or more states of the processor,
store data in and retrieve data from the single physical register file when the processor is in a first processor state,
identify registers of the single physical register file that have a first state as a first group of registers,
identify remaining registers of the single physical register file as a second group of registers in response to an indication that the processor is to enter a second processor state from the first processor state, and
store data in and retrieve data from the second group of registers and not the first group of registers when the processor is in the second processor state.

2. The register system of claim 1, further comprising:
an architectural register mapping table (ARMT) configured to have a plurality of ARMT entries each ARMT entry configured to correspond to a respective architectural register, each ARMT entry further configured to record a physical register identifier of a respective one of the physical registers that a corresponding architectural register is renamed to; and
a physical register mapping table (PRMT) configured to have a plurality of PRMT entries each PRMT entry configured to correspond to a respective one of the physical registers, each PRMT entry further configured to have a state field indicative of one of the plurality of operational states that the corresponding respective one of the physical registers is in and an AR field indicative of the corresponding architectural register that is renamed to the corresponding respective one of the physical registers.

3. The register system of claim 2 wherein each PRMT entry further includes:
a validity field configured to have a first validity value indicative of the corresponding respective one of the physical registers being a latest one of the physical registers that the architectural register indicated in the AR field is renamed to or a second validity value indicative of the corresponding respective one of the physical registers not being the latest one of the physical registers that the architectural register indicated in the AR field is renamed to; and
a lock field indicative of whether or not the corresponding respective one of the physical registers is identified as one of the physical registers in the first group of registers.

4. The register system of claim 3 wherein the register renaming logic is further configured to set the validity field of the PRMT entry of each of the physical registers in the second group of registers to the second validity value in response to receiving the indication that the processor is entering the second processor state from the first processor state.

5. The register system of claim 4 wherein the register renaming logic is further configured to set the state field of the respective PRMT entry of each of the physical registers in the second group of registers to indicate an empty state in response to receiving the indication that the processor is entering the second processor state from the first processor state.

6. The register system of claim 3 wherein the register renaming logic is further configured to set the lock field of each PRMT entry to a first lock value to unlock the respective PRMT entry when the processor is in the first processor state, wherein the register renaming logic is further configured to set the lock field of the respective PRMT entry of each of the physical registers in the first group of registers to a second lock value to lock the respective PRMT entry in response to receiving the indication that the processor is entering the second processor state from the first processor state, and wherein the register renaming logic is further configured to store data in and retrieve data from only those physical registers whose respective PRMT entries are unlocked when the processor is in the second processor state.

7. The register system of claim 5 wherein the register renaming logic is further configured to set the state field of the respective PRMT entry of each of the physical registers in the second group of registers to indicate an empty state and the register renaming logic is further configured to set the validity field of the PRMT entry of each of the physical registers in the second group of registers to the second validity value before the processor enters the first processor state from the second processor state in response to receiving the indication that the processor is entering the first processor state from the second processor state.

8. The register system of claim 6 wherein the register renaming logic is further configured to set the lock field of the respective PRMT entry of each of the physical registers in the second group of registers to the first lock value to unlock the respective PRMT entry before the processor enters the first processor state from the second processor state in response to receiving the indication that the processor is entering the first processor state from the second processor state.

9. The register system of claim 2 wherein the register renaming logic is further configured to reset each ARMT entry before the processor enters the second processor state from the first processor state in response to receiving the indication that the processor is entering the second processor state from the first processor state, and wherein the register renaming logic is further configured to restore the respective physical register identifier recorded in each ARMT entry based on the AR field of each one of the PRMT entries corresponding to the physical registers in the first group of registers before the processor enters the first processor state from the second processor state in response to receiving the indication that the processor is entering the first processor state from the second processor state.

10. The register system of claim 1 wherein the first processor state comprises a normal processor state, and wherein the second processor state comprises one of an interruption and an exception.

11. A processor, comprising:
a single physical register file configured to store data, each physical register of the single physical register file identified by a corresponding physical register identifier and configured to operate in having one of a plurality of operational states;
an architectural register mapping table (ARMT) configured to have a plurality of ARMT entries each ARMT entry configured to correspond to a respective architectural register, each ARMT entry further configured to record a physical register identifier of a respective one of the physical registers that a corresponding architectural register is renamed to;
a physical register mapping table (PRMT) configured to have a plurality of PRMT entries each PRMT entry configured to correspond to a respective one of the physical registers, each PRMT entry further configured to have a state field indicative of one of the plurality of operational states that the corresponding respective one of the physical registers is in and an AR field indicative of the corresponding architectural register that is renamed to the corresponding respective one of the physical registers; and
register renaming logic configured to:
initialize a plurality of indicators, at least one indicator corresponding to each physical register, said indicators arranged to control access to each physical register based at least in part on one or more states of the processor,
set the ARMT entries and the PRMT entries,
store data in the physical registers,
distinguish a first group of the physical registers that are in a first operational state from a second group of the physical registers that are in one of the operational states other than the first operational state before the processor enters a second processor state from a first processor state, and
utilize the second group of the physical registers for architectural register renaming while maintaining data stored in the first group of the physical registers and while maintaining the respective PRMT entries unchanged when the processor is in the second processor state.

12. The processor of claim 11 wherein each PRMT entry further includes:
a validity field configured to have a first validity value indicative of the corresponding respective one of the physical registers being a latest one of the physical registers that the architectural register indicated in the AR field is renamed to or a second validity value indicative of the corresponding respective one of the physical registers not being the latest one of the physical registers that the architectural register indicated in the AR field is renamed to; and
a lock field indicative of whether or not the corresponding respective one of the physical registers is identified as one of the physical registers in the first group of the physical registers.

13. The processor of claim 12 wherein the register renaming logic is further configured to set the validity field of the PRMT entry of each physical register of the second group of the physical registers to the second validity value in response to receiving an indication that the processor is entering the second processor state from the first processor state.

14. The processor of claim 13 wherein the register renaming logic is further configured to set the state field of the respective PRMT entry of each physical register of the second group of the physical registers to indicate an empty state in response to receiving the indication that the processor is entering the second processor state from the first processor state.

15. The processor of claim 12 wherein the register renaming logic is further configured to set the lock field of each PRMT entry to a first lock value to unlock the respective PRMT entry when the processor is in the first processor state, wherein the register renaming logic is further configured to set the lock field of the respective PRMT entry of each physical register of the first group of the physical registers to a second lock value to lock the respective PRMT entry in response to receiving an indication that the processor is entering the second processor state from the first processor state, and wherein the register renaming logic is further configured to store data in and retrieve data from only those physical registers whose respective PRMT entries indicate an unlocked status for the corresponding physical registers.

16. The processor of claim 14 wherein the register renaming logic is further configured to set the state field of the respective PRMT entry of each physical register of the second group of the physical registers to indicate an empty state and the register renaming logic is further configured to set the validity field of the respective PRMT entry of each physical register of the second group of the physical registers to the second validity value before the processor enters the first processor state from the second processor state in response to receiving the indication that the processor is entering the first processor state from the second processor state.

17. The processor of claim 15 wherein the register renaming logic is further configured to set the lock field of the respective PRMT entry of each physical register of the second group of the physical registers to the first lock value to unlock the respective PRMT entry before the processor enters the first processor state from the second processor state in response to receiving the indication that the processor is entering the first processor state from the second processor state.

18. The processor of claim 11 wherein the register renaming logic is further configured to reset each ARMT entry before the processor enters the second processor state from the first processor state in response to receiving an indication that the processor is entering the second processor state from the first processor state.

19. The processor of claim 18 wherein the register renaming logic is further configured to restore the respective physical register identifier recorded in each ARMT entry based on the AR field of each one of the PRMT entries corresponding to the physical registers in the first group of the physical registers before the processor enters the first processor state from the second processor state in response to receiving an indication that the processor is entering the first processor state from the second processor state.

20. The processor of claim 11 wherein the first processor state comprises a normal processor state, and wherein the second processor state comprises one of an interruption and an exception.

21. A method of utilizing a single physical register file in a processor for register renaming, the method comprising:
   initializing a plurality of indicators, at least one indicator corresponding to each physical register in the single physical register tile, said indicators arranged to control access to each physical register based at least in part on one or more states of the processor;
   altering data stored in a first physical register of the single physical register file to rename a first architectural register to the first physical register when the processor is in a first processor state;
   detecting that the processor is to enter a second processor state from the first processor state;
   determining a respective operational state of each physical register of the single physical register file in response to detecting that the processor is to enter the second processor state from the first processor state;
   identifying those physical registers of the single physical register file having a first operational state as a first group of physical registers and those physical registers of the single physical register file having an operational state other than the first operational state as a second group of physical registers in response to detecting that the processor is to enter the second processor state from the first processor state;
   altering data stored in a second physical register from among the second group of physical registers to rename a second architectural register to the second physical register of the second group of physical registers when the processor is in the second processor state; and
   maintaining data stored in the first group of physical registers when the processor is in the second processor state.

22. The method of claim 21, further comprising:
   setting the respective operational state of each physical register of the second group of physical registers to a second operational state in response to detecting that the processor is to enter the second processor state from the first processor state.

23. The method of claim 22, further comprising:
   detecting that the processor is to return to the first processor state from the second processor state; and
   setting the respective operational state of each physical register of the second group of physical registers to the second operational state in response to detecting that the processor is to return to the first processor state from the second processor state.

24. The method of claim 21 wherein altering data stored in a first physical register of the single physical register file to rename a first architectural register to the first physical register comprises:
   selecting the first physical register from the single physical register file to rename the first architectural register to the first physical register;
   recording an identifier of the first physical register in an architectural register mapping table (ARMT) entry associated with the first architectural register;
   recording an identifier of the first architectural register in a physical register mapping table (PRMT) entry associated with the first physical register;
   storing data associated with the first architectural register in the first physical register; and
   updating a state field of the PRMT entry associated with the first physical register to indicate one of a plurality of operational states the first physical register is in.

25. The method of claim 24, further comprising:
   setting a lock field of the PRMT entry associated with each physical register of the single physical register file to indicate an unlocked status when the processor is in the first processor state.

26. The method of claim 25 wherein identifying those physical registers of the single physical register file having a first operational state as a first group of physical registers and those physical registers of the single physical register file having an operational state other than the first operational state as a second group of physical registers in response to detecting that the processor is to enter the second processor state from the first processor state comprises:
   updating a lock field of the PRMT entry associated with each of the physical registers identified as having the first operational state to indicate a locked status in response to detecting that the processor is to enter the second processor state from the first processor state.

27. The method of claim 26 wherein altering data stored in a second physical register from among the second group of physical registers to rename a second architectural register to the second physical register of the second group of physical registers when the processor is in the second processor state comprises:
   selecting the second physical register from the second group of physical registers to rename the second architectural register to the second physical register;
   recording an identifier of the second physical register in an ARMT entry associated with the second architectural register;
   recording an identifier of the second architectural register in a PRMT entry associated with the second physical register;
   storing data associated with the second architectural register in the second physical register; and
   updating the state field of the PRMT entry associated with the second physical register to indicate one of a plurality of operational states the second physical register is in.

28. A method of utilizing a set of physical registers in a processor for register renaming, the method comprising:
   initializing a plurality of indicators, at least one indicator corresponding to each physical register in the set of physical registers, said indicators arranged to control access to each physical register based at least in part on one or more states of the processor;
   selecting a first physical register from the set of physical registers to rename a first architectural register to the first physical register when the processor is in a first processor state;
   recording an identifier of the first architectural register in a first field of a physical register mapping table (PRMT) entry associated with the first physical register;
   updating a second field of the PRMT entry associated with the first physical register to indicate one of a plurality of operational states the first physical register is in;
   detecting that the processor is to enter a second processor state;
   updating a third field of the PRMT entry associated with each of the physical registers having a first operational state to label the respective physical register in response to detecting that the processor is to enter the second processor state; and selecting a second physical register from the set of physical registers other than the labeled physical registers to rename a second architectural register to the second physical register when the processor is in the second processor state.

29. The method of claim 28 wherein updating a third field of the PRMT entry associated with each of the physical registers having a first operational state to label the respective physical register in response to detecting that the processor is to enter the second processor state comprises:

setting the third field of the PRMT entry associated with each of the physical registers to a first value when the processor enters the first processor state; and updating the third field of the PRMT entry associated with each of the physical registers having a first operational state to a second value different from the first value to label the respective physical register in response to detecting that the processor is to enter the second processor state.

30. The method of claim 29, further comprising:
detecting that the processor is to return to the first processor state from the second processor state; and
resetting the third field of the PRMT entry associated with each of the labeled physical registers to the first value in response to detecting that the processor is to return to the first processor state from the second processor state.

31. The method of claim 30, further comprising:
selecting a third physical register from the set of physical registers to rename a third architectural register to the third physical register after the processor returns to the first processor state from the second processor state; and
recording an identifier of the third architectural register in the first field of the PRMT entry associated with the third physical register.

32. The method of claim 28, further comprising:
recording an identifier of the first physical register in an architectural register mapping table (ARMT) entry associated with the first architectural register to rename the first architectural register to the first physical register; and
resetting the ARMT entry associated with the first architectural register in response to detecting that the processor is to enter the second processor state.

33. The method of claim 32, further comprising:
detecting that the processor is to return to the first processor state from the second processor state; and
restoring the ARMT entry associated with the first architectural register by recording in the ARMT entry associated with the first architectural register the identifier of the physical register the first architectural register was renamed to before the processor entered the second processor state in response to detecting that the processor is to return to the first processor state from the second processor state.

34. The method of claim 29, further comprising:
updating the second field of the PRMT entry associated with each of the physical registers having the first value in the third field to indicate a second operational state in response to detecting that the processor is to enter the second processor state.

35. The method of claim 34, further comprising:
detecting that the processor is to return to the first processor state from the second processor state; and
updating the second field of the PRMT entry associated with each of the physical registers having the first value in the third field to indicate a second operational state in response to detecting that the processor is to return to the first processor state from the second processor state.

* * * * *